United States Patent [19]

Stone et al.

[11] 4,193,887

[45] * Mar. 18, 1980

[54] FILLED DETERGENT FOAM MADE BY A ONE SHOT PROCESS

[75] Inventors: Herman Stone, Hazelton; Peter D. Pauly, Mountaintop, both of Pa.

[73] Assignee: Tenneco Chemicals, Inc., Saddle Brook, N.J.

[*] Notice: The portion of the term of this patent subsequent to Nov. 7, 1995, has been disclaimed.

[21] Appl. No.: 935,033

[22] Filed: Aug. 18, 1978

Related U.S. Application Data

[63] Continuation-in-part of Ser. No. 780,701, Mar. 24, 1977, Pat. No. 4,124,518.

[51] Int. Cl.$^2$ .................... C08G 18/08; C08G 18/14; C08J 9/12; C11D 17/04
[52] U.S. Cl. .................... 252/91; 15/104.93; 252/134; 252/174; 252/DIG. 16; 428/160; 428/311; 521/121; 521/122; 521/905
[58] Field of Search .................. 260/2.5 AG, 2.5 AK, 260/2.5 BD; 252/91, 134, 174, DIG. 16; 15/104.93; 428/160, 311, 423, 425; 521/121, 122, 905

[56] References Cited

U.S. PATENT DOCUMENTS

| | | | |
|---|---|---|---|
| 2,977,330 | 3/1961 | Brower | 260/2.5 |
| 3,002,937 | 10/1961 | Parker | 252/91 X |
| 3,080,256 | 3/1963 | Bundy | 106/72 X |
| 3,151,993 | 10/1964 | Bundy | 106/72 X |
| 3,594,334 | 7/1971 | Marlin | 260/2.5 AG |
| 3,619,843 | 11/1971 | Richter | 252/91 X |
| 3,799,898 | 3/1974 | Lamplugh | 260/2.5 AD |
| 3,810,841 | 5/1974 | Richter | 252/91 |
| 3,912,665 | 10/1975 | Spitzer | 260/2.5 E |
| 4,051,081 | 9/1977 | Jabs | 260/2.5 AD |

*Primary Examiner*—Dennis L. Albrecht
*Attorney, Agent, or Firm*—James P. Scullin

[57] ABSTRACT

Filled detergent hydrophilic flexible polyurethane foams having a reduced and controlled rate of release of detergent from the foam are provided.

9 Claims, No Drawings

FILLED DETERGENT FOAM MADE BY A ONE SHOT PROCESS

This is a continuation-in-part of our copending appliction Ser. No. 780,701 filed Mar. 24, 1977, now U.S. Pat. No. b 4,124,518.

BACKGROUND OF THE INVENTION

1. Field of the Invention

This invention relates to polyurethane foams which contain a filler and an alkyl aryl sulfonate detergent. The foams are useful as sponges for cleaning purposes, such as the deterging of hard surfaces for example, and are characterized by an improvement in the rate of release of the detergent when in contact with water when compared with similar polyurethane foams containing fillers and detergents known in the prior art. The filled detergent foams of this invention are prepared by a process wherein the filler and detergent are first mixed to form a first mixture which is then mixed with a normally liquid polyether polyol to form a second mixture, and the second mixture is then blended with conventional polyurethane foam-forming ingredients.

2. Prior Art

U.S. Pat. No. 3,810,841 to Ferdinand Joseph Richter, patented May 14, 1974, describes the preparation of a resilient polyurethane foam by the reaction of a polyester polyol, tolylene diisocyanate and water as a blowing agent in a one-shot system. Abrasives, such as kaolin, and detergents, such as alkylaryl sulfonates, can be incorporated into the foam, making it useful as a sponge for cleansing purposes.

SUMMARY OF THE INVENTION

The present invention provides an improved one-shot procedure for the manufacture of a flexible polyurethane foam which contains a filler and an alkylaryl sulfonate detergent. In practicing the present invention, the filler and the detergent are mixed to form a first mixture which is then mixed with a normally liquid polyether polyol to form a second mixture. This second mixture, tolylene diisocyanate, and water as a blowing agent are introduced into the mixing chamber of a foam machine whereby there is made a foam which contains both the filler and the detergent. The result of mixing the filler, detergent and polyol in the manner just described and then introducing the mixture containing the three ingredients into the mixing chamber is improved processability, namely, lower viscosity of the mixture of filler, detergent and polyol, so that the mixture can be more easily pumped into the mixing chamber. A further desirable result of mixing the filler, detergent and polyol in the manner described, particularly when the weight ratio of detergent to filler is within the range from one to 3.5, is a reduction in the rate of release of detergent from the foam, as compared with prior art foams containing detergent and filler, when the foam is wet with water.

In the practice of this invention, the reaction mixture from which the polyurethane foam is produced can include a diol having from 2 to 8 carbon atoms, for example, 1,4-cyclohexane dimethanol or diethylene glycol, for the purpose of improving the tensile and tear strengths of the foam, particularly when wet.

Those skilled in the art will understand the other materials conventionally used in the manufacture of polyurethane foams (for example, surfactants, catalysts and colors) can also be introduced into the mixing chamber.

DETAILED DESCRIPTION OF THE INVENTION

The normally liquid polyether polyol used in the practice of this invention can be one which is conventionally used in the art in the manufacture of flexible polyurethane foams. The polyol is usually a derivative of 1,2-propylene oxide or both 1,2-propylene oxide and ethylene oxide, the ethylene oxide amounting to up to about 30 percent by weight of the propylene oxide and ethylene oxide. When ethylene oxide is used, the ethylene oxide residues can be present as blocks or can be alternately or randomly distributed. In the manufacture of the polyol, the propylene oxide or both propylene oxide and ethylene oxide are reacted with a polyhydric initiator, such as glycerol, trimethylol ethane, trimethylolpropane, or 1,2,6-hexanetriol. Some representative polyether polyols which are useful in practicing this invention are: Voranol 3140 or CP-3140 manufactured by Dow Chemical; PG-412 manufactured by Olin; F-3514 manufactured by Jefferson Chemical; and E-363 manufactured by Union Carbide. In general, the normally liquid polyether polyol used will have an average molecular weight within the range from about 2000 to about 7000 and a hydroxyl number within the range from about 25 to about 150.

In addition to the normally liquid polyether polyol, the reaction mixture from which the foam is produced can also contain a diol having from 2 to 8 carbon atoms, inasmuch as the use of such a diol increases the tensile and tear strengths of the foam, particularly when wet. Among the useful diols are ethylene glycol, diethylene glycol, triethylene glycol, propylene glycol, dipropylene glycol, trimethylene glycol, 1,2-butandediol, 1,3-butanediol and 1,4-cylohexane dimethanol. In general, the amount of diol used will be within the range from about two to about ten percent by weight, based upon the weight of the normally liquid polyol.

Tolylene diisocyanate is used for reaction with the normally liquid polyol and the diol, if used, to form the polyurethane and also for reaction with the water introduced into the reaction mixture to form carbon dioxide which expands the polyurethane. Preferably, the tolylene diisocyanate used is the 65 percent 2,4-isomer, 35 percent 2,6-isomer mixture (TDI 65/35), but other tolylene diisocyanates, such as the 2,4-isomer in pure form; the 80 percent 2,4-isomer, 20 percent 2,6-isomer mixture (TDI 80/20); or a 2,4-isomer, 2,6-isomer mixture containing at least 65 percent of the 2,4-isomer can also be used. Those skilled in the art will readily understand how much tolylene diisocyanate and water to introduce into the reaction mixture, and in this connection the accompanying Examples serve as a guide.

The reaction mixture used to produce the polyurethane foam also includes an alkylaryl sulfonate detergent, usually a sodium alkyl benzene sulfonate or sodium alkyl naphthalene sulfonte. Where the sulfonate used is an alkyl benzene sulfonate, the benzene ring of the sulfonate will usually have only one alkyl substituent and such substituent will contain from 8 to 18 carbon atoms. Among such alkyl benzene sulfonates are sodium linear dodecylbenzene sulfonate, sodium keryl benzene sulfonate, sodium tridecylbenzene sulfonate and sodium nonylbenzene sulfonate. On the other hand, where the sulfonate used is an alkyl naphthalene sulfonate, the naphthalene ring of the sulfonate will usually have one or two alkyl substituents and the total number of carbon atoms in the alkyl substituents will be between 3 and 10. Among such sulfonates are sodium monoisopropylnaphthalene sulfonate, sodium diisopropylnaphthalene sulfonate, sodium diamylnaphthalene sulfonate and sodium monocaprylnaphthalene sulfonate. The sulfonates in solid form are commercially available in 40 to 90 percent by weight active form, the rest being predominantly sodium sulfate. In practicing the present invention, it is preferred to use the 90 percent active form, which is the highest available commercially, but other forms can also be used. When the sulfonate is marketed admixed with water, the water serves to generate carbon dioxide for foam forming by reaction with the isocyanates. Generally speaking, the amount of sulfontes used will be from about 30 to 80 percent by weight calculated as pure sulfonate, based upon the weight of the polyol.

Useful clay fillers are described in U.S. Pat. No. 3,080,256, patented Mar. 5, 1963, naming Wayne M. Bundy as the inventor. As is disclosed in the Bundy patent, such compositions can be prepared by a procedure involving coating kaolin with a small amount (for example, from about 0.2 percent to about 2 percent by weight, based on the weight of the Kaolin) of a polyamine, such as ethylene diamine, hexamethylene diamine, tetraethylene diamine, diethylene triamine, tetraethylene pentamine and guanidine. Generally speaking, the amount of kaolinite coated with the polyamine used will be from about 20 to 60 percent by weight, based upon the weight of the polyol.

Other useful clay fillers are described in U.S. Pat. No. 3,151,993, patented Oct. 6, 1964, also naming Wayne M. Bundy as the inventor. As is disclosed in this patent, such fillers can be prepared by a procedure involving coating kaolinite particles with aluminum hydroxide precipitated in situ at a pH between about 7.5 to 9. Here again, generally speaking, the amount of kaolinite coated with aluminum hydroxide used will be from about 20 to 60 percent by weight, based upon the weight of the polyol.

As is conventional in the art pertaining to the manufacture of polyurethane foam, the reaction mixture will also contain a surfactant, preferably an organosilicon surfactant, also commonly termed silicone surfactant. As is well known in the art, silicone surfactants perform several functions in the formation of polyurethane foams, including the prevention of collapse during foam rise and the control of cell size. The organosilicon surfactants contain one or more hydrophobic groups and one or more hydrophilic groups. The hydrophobic groups comprise a plurality of silicon atoms, generally in the form of repeating siloxane groups, i.e. groups having the structure

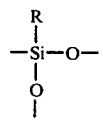

in which R is a hydrocarbyl radical. The hydrophilic groups generally consist of a plurality of oxyalkylene radicals in the form of a chain of repeating units. In one type of silicone sufactant, the backbone of the molecule comprises a chain of siloxane groups to which are attached pendant polyoxyalkylene hydrophilic groups. In another type, a chain of alternating polysiloxane and polyoxyalkylene segments form the backbone of the molecule. In a third, less common type, the polymer backbone is formed by a carbon-to-carbon chain to which are attached silicon atoms and long chain hydrophilic groups. The various types of organosilicon surfactants for use in the manufacture of polyurethane foam are well known in the art, described extensively in the literature, and sold commerically. Some representative organosilicon surfactants which are suitable for use in the present invention are: L-520, L-540, and L-5720 manufactured by Union Carbide Corp.; and DC-191, DC-196 and DC-198 manufactured by Dow Corning. The amount of organosilicon surfactant used in this invention will generally be in the range of from about 0.01 to about one part by weight per 100 parts by weight of polyol, although lesser or greater amounts can be used, if desired.

As is also conventional in the art pertaining to the manufacture of polyurethane foam, the reaction mixture will also contain a catalyst. Catalysts suitable for use in this invention are conventional ones in the polyurethane foam art, and include tertiary amines and metallic compounds. Useful tertiary amines include: N-alkylmorpholines such as N-ethylmorpholine; N,N-dialkylcyclohexylamines where the alkyl groups are methyl, ethyl, propyl, butyl, etc.; trialkylamines such as triethylamine, tripropylamine, tributylamine, triamylamine, etc.; triethylenediamine, bis (2-dimethylamineothyl) ether; N,N-dimethylaminoethyl N',N'-dimethylaminopropyl ether; the tertiary amine sold by Jefferson Chemical Co., under the name THANCAT DD; and other tertiary amines well known in the art. Useful metal compounds include those of bismuth, lead, titanium, iron, antimony, uranium, cadmium, cobalt, aluminum, mercury, zinc, nickel, cerium, vanadium, copper, manganese, zirconium, tin, and others. Tin compounds are particularly useful, some examples being stannous octoate, stannous 2-ethylhexoate, stannous oleate, dibutyltin bis (2-ethylhexoate), and dibutyltin dilaurate. The levels of catalyst used are conventional.

The following Examples illustrate the invention or provide information pertinent thereto and are not limitative of the invention. The term "parts" means parts by weight, unless otherwise indicated.

EXAMPLES I TO III

A series of three slurries was prepared each containing 500 parts of Voranol 3140 (a proprietary polyether polyol having an average molecular weight of about 3800 and a hydroxyl number of about 45), 250 parts of a proprietary linear dodecylbenzene sodium sulfonate, and 100 parts of Kaogan-7 (a proprietary product of Georgia Kaolin Company, which is a treated kaolinite prepared as described in U.S. Pat. No. 3,080,256 having a median particle diameter (microns) of about 0.77).

In Example I, the polyol and sulfonate were mixed together, following which the mixture was mixed with the kaolinite. In Example II, the polyol and kaolinite were mixed together, following which the mixture was mixed with the sulfonate. In Example III, the sulfonate was mixed with the kaolinite, following which the mixture was mixed with the polyol. Table I sets forth the results obtained.

Table I

| Example | I | II | III |
|---|---|---|---|
| Initial viscosity in | | | |

Table I-continued

| Example | I | II | III |
|---|---|---|---|
| thousands of cps. at 25° C. | 30.2 | 30.2 | 15.8 |
| Viscosity after 75 hours in thousands of cps. at 25° C. | 54.0 | 43.0 | 22.8 |
| Specific Gravity | 1.10 | 1.09 | 1.06 |

EXAMPLES IV TO VI

Three samples of foam were prepared in a one-shot process using the formulations of Table II expressed in parts:

Table II

| Example | IV | V | VI |
|---|---|---|---|
| F-3514 | 100 | 100 | |
| Voranol 3140 | | | 100 |
| TDI 65/35 | 32.2 | 36.7 | 32.2 |
| Water | 1.8 | 1.8 | 1.8 |
| L-520 | 0.5 | 0.5 | 0.5 |
| Dabco 33-LV | 1.0 | 1.0 | 1.5 |
| C-2 | 0.2 | 0.2 | 0.2 |
| Linear dodecylbenzene sodium sulfonate | 30.0 | 30.0 | 50.0 |
| Kaogan-7 | 20.0 | 20.0 | 20.0 |
| Blue 45 | 1.0 | 1.0 | 1.0 |
| 1,4-cyclohexane dimethanol (1,4-CHDM) | 5.0 | | 5.0 |
| Diethylene glycol | | 5.0 | |
| L-501/F3514 (1/100) | 1.0 | 1.0 | |

F-3514 is a proprietary propoxylated glycerol having an average moleculr weight of 3500 and a hydroxyl number of 48. L-501 is a proprietary poly dimethyl siloxane used as a cell opener manufactured by Union Carbide. Dabco 33-LV is a proprietary solution of triethylene diamine in dipropylene glycol in a 33/67 weight ratio manufactured by Air Products. C-2 is proprietary stannous octoate manufactured by Witco. Blue 45 is a proprietary blend which contains copper phthalocyanine and acid azo red in tris isopropyl phenyl phosphate manufactured by FMC Corporation. Those skilled in the art will understand that other colors can be used, for example, yellow or green.

In making the three foam samples using the formulations of Table II, the sulfonate and Kaogan-7 were mixed to provide a first mixture which was then mixed with the F-3514 or Voranol 3140. The mixture thus produced was fed as a first stream to the mixing chamber of a foam machine. The TDI 65/35 was fed as a second stream to the mixing chamber, and the remaining ingredients were fed in one or more other streams to the mixing chamber. The foam produced had the following properties (ASTM D1564):

| Example | IV | V | VI |
|---|---|---|---|
| Density (lb/cu ft) | 4.1 | 4.9 | 5.6 |
| Dry tensile strength (psi) | 16.0 | 15.0 | 18.7 |
| Wet tensile strength (psi) | 8.6 | 6.9 | 5.3 |
| Dry ultimate elongation (per cent) | 153 | 139 | 210 |
| Wet ultimate elongation (per cent) | 151 | 126 | 137 |
| Dry tear strength (lb/linear in) | 3.0 | 2.7 | 4.2 |
| Wet tear strength (lb/linear in) | 1.0 | 0.8 | 1.2 |

EXAMPLES VII TO X

Four samples of foam were prepared in a one-shot process using the formulations of Table III expressed in parts:

Table III

| Example | VII | VIII | IX | X |
|---|---|---|---|---|
| Voranol 3140 | 100 | 100 | 100 | 100 |
| 1,4-CHDM | 5.0 | 5.0 | 5.0 | 5.0 |
| L-520 | 0.45 | 0.45 | 0.45 | 0.45 |
| Blue 45 | 3.8 | 3.8 | 3.8 | 3.8 |
| 33-LV | 2.5 | 2.0 | 2.0 | 2.0 |
| L-501/Voranol 3140 (1/100) | 1.0 | 1.0 | 1.0 | 1.0 |
| C-2 | 0.15 | 0.15 | 0.15 | 0.15 |
| Water | 1.0 | 1.0 | 1.0 | 1.0 |
| TDI 65/35 | 33.25 | 33.25 | 33.25 | 33.25 |
| Linear dodecylbenzene sodium sulfonate | 65.0 | 65.0 | 65.0 | 65.0 |
| Kaogan-7 | 20.0 | | | |
| Kaophile-2 | | 20.0 | | |
| Limestone No. 4 | | | 20.0 | |
| Hydrated alumina | | | | 20.0 |

Kaophile-2, a product of Georgia Kaolin Company, is a kaolinite coated with aluminum hydroxide prepared as described in U.S. Pat. No. 3,151,993, patented Oct. 6, 1964, naming Wayne M. Bundy as the inventor. Kaophile-2 has a median particle diameter (microns) of 0.20.

In making the four foam samples using the formulations of Table III, the sulfonate and Kaogan-7, Kaophile-2, limestone No. 4 or hydrated alumina were mixed to provide a first mixture which was then mixed with the Voranol 3140. The mixture thus produced was fed as a first stream to the mixing chamber of a foam machine. For Examples VII, VIII, IX and X, the viscosities of such first streams were 6,300; 6,650; 5,700 and 5,200 centipoises, respectively. The TDI 65/35 was fed as a second stream to the mixing chamber, and the remaining ingredients were also fed to the mixing chamber. The foams produced had the following properties (ASTM D1564):

| Example | VII | VIII | IX | X |
|---|---|---|---|---|
| Density (lb/cu ft.) | 5.84 | 5.38 | 5.24 | 5.00 |
| Resilience (per cent) | 28 | 28 | 28 | 26 |
| Dry tensile strength (psi) | 11.8 | 8.9 | 8.4 | 7.9 |
| Dry ultimate elongation (per cent) | 150 | 172 | 147 | 168 |
| Dry tear strength (lb/linear in) | 3.2 | 3.4 | 2.3 | 2.4 |
| Wet tensile strength (psi) | 5.1 | 7.1 | 2.2 | 2.9 |
| Wet ultimate elongation (per cent) | 133 | 166 | 149 | 149 |
| Wet tear strength (lb/linear in) | 1.9 | 1.9 | 0.97 | 0.96 |

EXAMPLES XI TO XIV

Four samples of foam were prepared in a one-shot process using the formulations of Table IV expressed in parts:

Table IV

| Example | XI | XII | XIII | XIV |
|---|---|---|---|---|
| F-3514 | 850 | 1000 | 1000 | 1000 |
| Kaogan-7 | 200 | 200 | 200 | 200 |
| L-520 | 5.0 | 5.0 | 5.0 | 5.0 |
| L-501/F3514 (1/100) | 10.0 | 10.0 | 10.0 | 10.0 |
| 33-LV | 10.0 | 10.0 | 10.0 | 10.0 |
| Blue-45 | 10.0 | 10.0 | 10.0 | 10.0 |

Table IV-continued

| Example | XI | XII | XIII | XIV |
|---|---|---|---|---|
| Linear dodecylbenzene sodium sulfonate | 300 | 300 | 300 | 300 |
| C-2 | 2.6 | 2.0 | 2.0 | 3.5 |
| Water | 18.0 | 18.0 | 18.0 | 18.0 |
| TDI 65/35 | 263.5 | 321.5 | 366.5 | 260.5 |
| F-50 | 150 | | | |
| 1,4-CHDM | | 50 | | |
| Diethylene glycol | | | 50 | |

F-50 is a polyester polyol prepared from diethylene glycol, trimethylolpropane and adipic acid. F-50 has an average molecular weight of about 2000 and a hydroxyl number of about 52.

In making the foam from samples using the formulations of Table IV, the sulfonate and Kaogan-7 were mixed to provide a first mixture which was then mixed with the F-3514 (also with the F-50 in Example XI). The mixture thus produced was fed as a first stream to the mixing chamber of a foam machine. The TDI 65/35 was fed as a second stream to the mixing chamber, and the remaining ingredients were also fed to the mixing chamber. The foams produced had the following properties (ASTM D1564):

| Example | XI | XII | XIII | XIV |
|---|---|---|---|---|
| Density (lb/cu ft) | 4.31 | 4.14 | 4.89 | 4.15 |
| Dry tensile strength (psi) | 10.9 | 16.0 | 15.0 | 14.3 |
| Wet tensile strength (psi) | 6.0 | 8.6 | 6.9 | 6.7 |
| Dry ultimate elongation (per cent) | 98.7 | 153.4 | 138.7 | 151.3 |
| Wet ultimate elongation (per cent) | 98.7 | 151.3 | 126.1 | 126.1 |
| Dry tear strength (lb/linear in) | 2.5 | 3.0 | 2.7 | 3.2 |
| Wet tear strength (lb/linear in) | 1.7 | 2.0 | 1.7 | 1.8 |

EXAMPLES XV TO XXI

Seven samples of foam were prepared in a one-shot process using the formulations of Table V expressed in parts:

Table V

| | XV | XVI | XVII | XVIII | XIX | XX | XXI |
|---|---|---|---|---|---|---|---|
| PG-412 | 200.0 | 200.0 | 200.0 | 200.0 | 200.0 | 200.0 | — |
| E-363 | — | — | — | — | — | — | 200.0 |
| Kaogan-7 | 40.0 | 40.0 | 40.0 | 40.0 | — | 40.0 | 40.0 |
| L-520 | 1.0 | 1.0 | 1.0 | 1.0 | 1.0 | 1.0 | 1.0 |
| L-501/PG-412 (1/100) | 3.0 | 3.0 | 2.0 | 2.0 | 2.0 | 1.0 | — |
| Dabco 33LV | 3.0 | 3.0 | 3.0 | 3.0 | 3.0 | 3.0 | 3.0 |
| Blue 45 | 2.0 | 2.0 | 2.0 | 2.0 | 2.0 | 2.0 | 2.0 |
| Linear dodecyl benzene sodium sulfonate | 100.0 | 100.0 | 100.0 | 100.0 | 100.0 | 100.0 | 100.0 |
| C-2 | 0.6 | 0.6 | 0.5 | 0.5 | 0.5 | 0.3 | 0.4 |
| Water | 3.6 | 1.6 | 2.6 | 3.6 | 3.6 | 3.6 | 3.6 |
| TDI 65/35 | 52.1 | 52.1 | 62.3 | 72.5 | 78.5 | 84.7 | 71.6 |
| Hydrite UF | — | — | — | — | 40.0 | — | — |
| 1,4 CHDM | — | — | — | — | — | 10.0 | — |

PG-412 is a proprietary polyether triol having an average molecular weight of about 3500 and an average hydroxyl number of about 48. E-363 is a proprietary graft polymer polyol containing acrylonitrile—styrene having an average molecular weight of about 3700 and a hydroxyl number of about 45. Hydrite UF is a proprietary washed untreated clay (kaolin).

In making the seven foam samples using the formulations of Table V, the sulfonate and Kaogan-7 or Hydrite UF were mixed to provide a first mixture which was then mixed with the PG-412 or E-363. The mixture thus produced was fed as a first stream to the mixing chamber of a foam machine. The TDI 65/35 was fed as a second stream to the mixing chamber, and the remaining ingredients were also fed to the mixing chamber. The foams produced had the following properties (ASTM D1564):

| Example | XV | XVI | XVII | XVIII | XIX | XX | XXI |
|---|---|---|---|---|---|---|---|
| Cream time, sec | 7 | 7 | 8 | 7 | 7 | 7 | — |
| Rise time, sec | 180 | 240 | 200 | 170 | 150 | 140 | — |
| Density (lb/cu ft) | 5.07 | 6.75 | 5.36 | 4.66 | 4.13 | 5.13 | 3.89 |
| Dry tensile strength* | 13.5 | 16.4 | 15.7 | 10.4 | 18.4 | 14.4 | 19.2 |
| Wet tensile strength* | 3.7 | 5.1 | 4.0 | 4.8 | 5.8 | 6.1 | 10.1 |
| Dry ultimate elongation* | 169 | 84 | 82 | 80 | 118 | 69 | 88 |
| Wet ultimate elongation* | 88 | 61 | 78 | 88 | 98 | 90 | 124 |
| Dry tear strength* | 3.2 | 2.45 | 2.3 | 2.55 | 2.6 | 3.3 | 2.2 |
| Wet tear strength* | 0.65 | 0.82 | 0.85 | 0.92 | 1.15 | 1.33 | 1.68 |

*Same units as in Examples XI to XIV

EXAMPLES XXII TO XXV

These Examples set forth formulations which can be used as described in Examples IV to VI to produce filled detergent hydrophilic flexible polyurethane foams in accordance with this invention:

| Example | XXII | XXIII | XXIV | XXV |
|---|---|---|---|---|
| PG-412 | 100 | | | |
| CP-3140 | | 100.0 | 100.0 | 100.0 |
| TDI (65/35) | 36.0 | 33.0 | 39.7 | 38.4 |
| Linear dodecyl-benzene sodium sulfonate | 50.0 | 59.1 | 65.0 | 60 |
| Kaogan-7 | 20.0 | 36.4 | 25.0 | 35 |
| 1,4-CHDM | 5.0 | 4.5 | 5.0 | 5 |
| L-520 | 0.25 | | | |
| Proprietary curing agent (28 percent tin by weight in the form of tin octoate) | 0.21 | | | |
| C-2 | | 0.2 | 0.2 | 0.33 |
| Blue 45 | 3.7 | 3.8 | | |
| Activator 33-LV | 1.35 | 1.75 | 3.0 | 1.8 |
| Water | 1.35 | 0.73 | 1.25 | |
| L-520 | | 0.10 | 0.1 | |
| Contaminant mix | | | | |
| PG-412 | 0.99 | | | |
| L-501 | 0.01 | | | |
| CP-3140 | | 2.05 | | |
| L-501 | | 0.02 | | |
| Green 30 pigment | | | 2.0 | |
| Kronitex 100 (proprietary tris isopropyl phenyl phosphate pigment dispersant) | | | 2.0 | |
| Water | | | | 1.27 |
| L-6202 (proprietary organo-silicon dispersant) | | | | 0.1 |

CP-3140 is a proprietary polyether polyol having an average molecular weight of about 3800 and a hydroxyl number of about 45.

EXAMPLES XXVI and XXVII

These Examples compare a filled detergent hydrophilic flexible polyurethane foam made in accordance with this invention (Example XXVI) with a foam made from the same formulation, but not using the novel process disclosed herein. The following formulation was used for each of these examples, expressed in parts by weight:

| | |
|---|---|
| Voranol 3140 | 100 |
| 1,4-CHDM | 5.0 |
| Green 35 | 5.0 |
| Dabso 33-LV | 1.8 |
| C-2 | 1.0 |
| L-6202 | 0.2 |
| water | 1.0 |
| TDI 65/35 | 33.1 |
| linear dodecylbenzene soidum sulfonate | 60.0 |
| Kaogan-7 | 35.0 |

In this formulation, Green 35 is a dispersion of a green pigment in an organic vehicle, and the other ingredients are as described in previous examples.

In making the foam of Example XXVI, the sulfonate detergent and Kaogen-7 were mixed together to form a first mixture which was then mixed with the Voranol 3140 to form a second mixture. The second mixture was then blended with the balance of the ingredients to provide a foam forming reaction mixture.

In making the foam of Example XXVII, the sulfonate detergent and Kaogen-7 were not pre-mixed with each other but were added separately to the Voranol 3140 to form a mixture which was much more viscous than the second mixture of the previous example. Employing high speed mixing, and with some difficulty, the mixture of detergent, Kaogen-7, and Voranol 3140 was blended with the other ingredients to provide a foam forming reaction mixture.

The resulting foams had the following physical properties:

| | Example XXVI | Example XXVII |
|---|---|---|
| Density, lb/cu.ft | 5.23 | 5.00 |
| Tensile Strength, lb./sq.in. | 17.0 | 19.2 |
| Ultimate Elongation, % | 210 | 214 |
| Tear Strength, lb./in. | 3.3 | 3.9 |

In order to determine the rate of release of detergent from the finished foams, a series of 1×1×1 inch cubes were cut from the foam at 105° C. and then placed in a desiccator at room temperature for 30 minutes. The bowl of a Kitchen Aid mixer was filled with 1000 ml. of tap water at 70° F. A foam sample was removed from the desiccator and weighed, and then placed in the mixer bowl. The mixer was then set on 2 setting and run for varying periods of time. The foam sample was then removed from the bowl, oven-dried and dessicated as before, and then reweighed to determine the amount of detergent which was extracted. The results are presented in Table VII.

TABLE VII

| | % Weight Loss | |
|---|---|---|
| Mixing Time, minutes | Example XXVI | Example XXVII |
| 0.5 | 17.2 | 21.2 |
| 1.0 | 20.3 | 23.3 |
| 2.5 | 22.3 | 23.5 |
| 5.0 | 24.6 | 26.9 |

In the second procedure, foam cubes were oven-dried for 3 hours at 105° C. and conditioned in a desiccator at room temperature for 24 hours. The cubes were then individually removed from the desiccator, weighed, placed in 200 ml. of water, and squeezed by hand for 10, 20, 30, and 40 times below the surface of the water. The foam cubes were then again dried in an oven at 105° C. for 5 hours, conditioned in a desiccator at room temperature for 24 hours, and then reweighed to determine the amount which had been extracted. The results are summarized in Table VIII.

TABLE VIII

| | % Weight Loss | |
|---|---|---|
| Number of Squeezes | Example XXVI | Example XXVII |
| 10 | 14.85 | 18.09 |
| 20 | 21.31 | 26.40 |
| 30 | 22.84 | 27.12 |
| 40 | 23.42 | 27.90 |

The results presented in Tables VII and VIII demonstrate that, under the same conditions, the foams made according to this invention release detergent at a significantly slower rate than do foams made according to methods previously known in the art. This improvement provides a longer useful life when such foams are employed for cleaning purposes in the presence of water.

What is claimed is:

1. As an article of manufacture, a filled detergent hydrophilic flexible polyurethane foam, produced by a process which comprises mixing a clay filler and an alkyl aryl sulfonate detergent to form a first mixture, mixing said first mixture with a normally liquid polyether polyol to form a second mixture, and introducing said second mixture, tolylene diisocyanate and water, as a blowing agent, into the mixing chamber of a foam machine whereby a filled detergent polyurethane foam is manufactured, wherein said second mixture contains from 20 to 60 percent by weight of filler, based upon the weight of the polyol, and wherein said second mixture contains from 30 to 80 percent by weight of sulfonate detergent, based upon the weight of the polyol.

2. An article of manufacture according to claim 1, wherein the weight ratio of detergent to filler is within the range from 1 to 3.5.

3. An article of manufacture according to claim 1, wherein said filler is kaolin coated with from about 0.2 to about 2 percent by weight, based upon the weight of the kaolin, of a polyamine.

4. An article of manufacture according to claim 3, wherein said polyamine is ethylene diamine.

5. An article of manufacture according to claim 1, wherein said sulfonate detergent is linear dodecyl benzene sodium sulfonate.

6. An article of manufacture according to claim 1, wherein said tolylene diisocyanate is a 65 percent 2,4-isomer, 35 percent 2,6-isomer mixture.

7. An article of manfacture according to claim 1, wherein from about 2 to about 10 percent by weight, based upon the weight of said polyol, of a diol having from 2 to 8 carbon atoms is also introduced into the mixing chamber.

8. An article of manufacture according to claim 7, wherein the diol is 1,4-cyclohexane dimethanol.

9. An article of manufacture according to claim 1 wherein an organosilicon surfactant and a catalyst are also introduced into the mixing chamber, the amount of said organosilicon surfactant being from about 0.01 to about 1.0 part by weight per 100 parts by weight of said polyol.

* * * * *

UNITED STATES PATENT OFFICE
CERTIFICATE OF CORRECTION

Patent No. 4,193,887   Dated Mar. 18, 1980

Inventor(s) Herman Stone and Peter D. Pauly

It is certified that error appears in the above-identified patent and that said Letters Patent are hereby corrected as shown below:

Column 1, line 7, after "No." delete -- b --

Column 10, line 23, after "foam" insert -- of each example and used in the following two test procedures.
  In the first procedure, foam cubes were oven-dried for 3 hours --

Column 10, line 29, before "2" insert the symbol -- # --

Signed and Sealed this

Eighth Day of July 1980

[SEAL]

Attest:

SIDNEY A. DIAMOND

Attesting Officer

Commissioner of Patents and Trademarks